(12) United States Patent
Bartholomew et al.

(10) Patent No.: US 8,574,482 B2
(45) Date of Patent: Nov. 5, 2013

(54) COLD CASTING METHOD AND APPARATUS

(75) Inventors: David A. Bartholomew, Ontario (CA); Brett Coates, Ontario (CA)

(73) Assignee: Fusioncast Inc., Oakville, Ontario (CA)

( * ) Notice: Subject to any disclaimer, the term of this patent is extended or adjusted under 35 U.S.C. 154(b) by 377 days.

(21) Appl. No.: 12/691,016

(22) Filed: Jan. 21, 2010

(65) Prior Publication Data

US 2010/0181701 A1 Jul. 22, 2010

Related U.S. Application Data

(60) Provisional application No. 61/202,016, filed on Jan. 21, 2009.

(51) Int. Cl.
B29C 39/12 (2006.01)

(52) U.S. Cl.
USPC ............ 264/319; 264/331.19; 264/570

(58) Field of Classification Search
USPC ............... 264/319, 331.19, 570
See application file for complete search history.

(56) References Cited

U.S. PATENT DOCUMENTS

| | | | | |
|---|---|---|---|---|
| 3,410,936 A | * | 11/1968 | Juras | 264/571 |
| 3,426,097 A | * | 2/1969 | Ilkka et al. | 525/512 |
| 3,489,723 A | * | 1/1970 | Kraft | 528/48 |
| 3,923,945 A | * | 12/1975 | Humphries | 523/220 |
| 3,964,537 A | | 6/1976 | Koch et al. | |
| 4,105,184 A | * | 8/1978 | Sumitomo | 249/79 |
| 4,358,419 A | * | 11/1982 | Byrne et al. | 419/10 |
| 4,664,171 A | | 5/1987 | Boenisch | |
| 4,816,182 A | * | 3/1989 | Novich et al. | 516/90 |
| 4,904,411 A | * | 2/1990 | Novich et al. | 516/33 |
| 5,047,181 A | * | 9/1991 | Occhionero et al. | 264/28 |
| 5,047,182 A | * | 9/1991 | Sundback et al. | 264/28 |
| 5,213,746 A | | 5/1993 | Tarwater | |
| 5,322,109 A | | 6/1994 | Cornie | |
| 5,334,647 A | * | 8/1994 | Sperk et al. | 524/507 |
| 5,344,635 A | * | 9/1994 | Bujard et al. | 423/412 |
| 5,346,660 A | * | 9/1994 | Matsumoto | 264/69 |
| 5,505,791 A | | 4/1996 | Tahara et al. | |
| 5,518,537 A | | 5/1996 | Muschio, III | |
| 5,553,658 A | * | 9/1996 | Cornie | 164/97 |
| 5,686,507 A | * | 11/1997 | Hermele et al. | 523/153 |
| 5,787,667 A | * | 8/1998 | Sheahan et al. | 52/315 |
| 5,820,894 A | * | 10/1998 | Kreutzer | 425/389 |
| 5,983,973 A | * | 11/1999 | Cornie | 164/97 |
| 6,103,156 A | * | 8/2000 | Holtzberg | 264/102 |
| 6,309,587 B1 | * | 10/2001 | Gniatczyk et al. | 264/510 |

(Continued)

FOREIGN PATENT DOCUMENTS

| | | |
|---|---|---|
| JP | 2004-360008 | 12/2004 |
| WO | 2007/109300 A2 | 9/2007 |

*Primary Examiner* — Christina Johnson
*Assistant Examiner* — Saeed Huda
(74) *Attorney, Agent, or Firm* — Clark & Brody (57) ABSTRACT

Method of cold casting a composite product which includes the steps of making a composite mixture comprising a curable resin and metal particles, pouring the composite mixture into a mold made of a machinable and recyclable substrate; and curing the composite mixture in a pressurized chamber for a time sufficient to eliminate the appearance of bubbles in the cured composite mixture. The curable resin is selected to have a cure time and a viscosity that allows the metal particles to fall to the bottom of the mold to appear on the face of the composite product. The finished product can resemble traditional foundry cast metal products while employing a much lower amount of metal to achieve cost savings.

10 Claims, 5 Drawing Sheets

(56) References Cited

U.S. PATENT DOCUMENTS

| | | | |
|---|---|---|---|
| 6,344,160 B1 * | 2/2002 | Holtzberg | 264/102 |
| 6,607,818 B1 * | 8/2003 | Satz et al. | 428/323 |
| 6,616,885 B2 | 9/2003 | Lombardi et al. | |
| 6,638,460 B1 * | 10/2003 | Wahl | 264/154 |
| 6,960,542 B2 | 11/2005 | Stalberg | |
| 7,037,455 B2 | 5/2006 | Marine | |
| 7,042,622 B2 * | 5/2006 | Huibers et al. | 359/291 |
| 7,160,496 B2 * | 1/2007 | Patel et al. | 264/302 |
| 7,192,546 B2 * | 3/2007 | Franks et al. | 264/319 |
| 7,544,317 B2 * | 6/2009 | Kraker | 264/73 |
| 2003/0096070 A1 * | 5/2003 | Matsuoka et al. | 428/36.9 |
| 2003/0155689 A1 * | 8/2003 | Franks et al. | 264/319 |
| 2006/0255507 A1 * | 11/2006 | Bowden et al. | 264/319 |
| 2008/0199944 A1 | 8/2008 | Lee et al. | |
| 2009/0047512 A1 * | 2/2009 | Conroy | 428/338 |
| 2011/0168363 A9 * | 7/2011 | Reppel et al. | 165/133 |

* cited by examiner

COLD CASTING METHOD AND APPARATUS

This application claims the benefit of U.S. provisional application No. 61/202,016, filed Jan. 21, 2009 under 35 U.S.C. 119 (e), which is herein incorporated by reference.

FIELD OF THE INVENTION

The present invention relates to, amongst other things, cold casting methods and apparatus used in the methods.

BACKGROUND OF THE INVENTION

"Cold Casting" is a term used to describe the process of mixing metal powder with a resin and applying the mixture into a mold. The finished casting can be made to have the appearance and weight of solid metal, if required. The metal cold cast process is faster and less expensive when compared with foundry casting of molten metal. Different metal powders such as aluminum, brass, nickel-silver, copper, and combinations thereof, can be used depending on the desired effect.

To make a metal cold cast composite product according to a prior art method, metal powder (typical mesh size 325 to 225) is mixed into a urethane resin until the mixture is thick and creamy. The mixture is then "slush-cast" (poured into a rubber mold and rolled around) or brushed onto the mold surface (gel coat) until the resin cures. The gel coat is then back-filled with straight resin, resin mixed with metal powder, resin mixed with lead shot (for weight), or a filler material. The entire mixture is cured until solid. To expedite the curing process, mild heat may be applied, such as by putting the filled mold into a curing oven.

To facilitate removal of the cured composite product, a release agent is sprayed over the entire mold surface prior to adding the liquid metal-resin mixture to the mold. Pigments may be added to the liquid metal-resin mixture prior to casting to achieve the desired colour.

Once curing is complete, the cast composite product is removed and lightly abraded with a medium/fine steel wool until the desired metal shine and luster are attained. The product may be finished with, for example, a base coat paint to give the casting added depth and dimension. To prevent oxidation of the metal, the finished casting may also be sprayed with a clear gloss spray (e.g. made of acrylic).

Traditional cold casting methods and products made thereby have a number of disadvantages.

One disadvantage is that each different final product must have its own mold. The mold is made using an original or prototype of the desired final product. This makes it more costly to manufacture products on a small scale. Once the production run is over, there is no longer a use for the mold and prototype or original. These articles tend not to be reusable and are often discarded and contribute to landfill.

Another disadvantage is that composite products made by traditional cold casting methods tend to lack tensile strength and not be very durable. They are prone to damage and breakage and do not resemble solid metal castings except in terms of their appearance and (sometimes) weight. Long curing resins can be used to reduce the amount of bubbles formed in the mixture by allowing time for the bubbles to rise to the surface and be released to the atmosphere. The fewer the bubbles, the greater the tensile strength of the finished product. However, the longer the curing time, the fewer products that can be made per unit time and therefore the higher the production costs. Moreover, even using long curing resins will not completely eliminate the appearance of bubbles in the final cured product.

The present invention is intended to at least partially overcome one or more of the above disadvantages by providing a relatively inexpensive, environmentally friendly method of cold casting that is suitable for the commercial production of custom "one-off" products as well as generic products on a large scale. Products made by the present method can be made denser, stronger and more durable than products made according to traditional cold casting methods, so as to more closely resemble articles made from foundry casting of molten metals.

SUMMARY OF THE INVENTION

In accordance with a first aspect, the invention provides a method of cold casting a composite product, comprising or consisting essentially of the steps of:
  (i) making a composite mixture comprising a curable resin;
  (ii) pouring the composite mixture into a mold made of a machinable and recyclable substrate; and
  (iii) curing the composite mixture in a pressurized chamber for a time sufficient to eliminate the appearance of bubbles in the cured composite mixture.

The composite mixture may comprise metal particles in combination with the curable resin. More than 70% w/w of the metal particles, based on the total weight of the metal particles, may have a mesh size of −325.

The mold may be made of machinable and recyclable substrate, such as wax.

The pressurized chamber may be sized and shaped to conform to the size and shape of the mold to reduce wasted space around the mold. The chamber may be pressurized to between about 40 psi and about 70 psi.

The curable resin may be made from a two part resin system, the first part being a reaction product of a polyether blend with diphenylmethane diisocyanate and the second part being a liquid polyol and organic amine curative blend.

The method may further comprise the step of post-curing the composite mixture an oven at an elevated temperature until the mixture is fully cured. The elevated temperature is chosen to achieve complete curing in a reasonable time frame. Typically, the temperature will be greater than 55° C., 60° C., 70° C., 80° C. or 90° C., and less than 125° C. or 110° C. An exemplary temperature for post-curing is about 100° C. It will be appreciated that higher or lower temperatures can be employed. The actual temperature employed will affect the actual time required to fully cure the mixture. In typical situations wherein the curing temperature is between 55° C. and 100° C., cure times will typically range between 16-24 hours. Shorter and longer curing times are contemplated based on the actual curing temperature and ingredients used in the composite mixture, as will be appreciated by the person skilled in the art.

According to a second aspect of the invention, there is provided a cold cast composite product made by the method according to the first aspect.

The invention provides, as per a third aspect thereof, a pressure curing apparatus for curing a composite mixture to produce a cured composite product and to eliminate the appearance of bubbles in the cured composite product, the apparatus comprising or consisting essentially of:
  (a) a housing defining a pressure curing chamber, the housing having a fluid opening through which fluid can flow into the chamber and an access opening in communication with the chamber through which a filled mold can be inserted into the chamber and removed from the chamber;

(b) a closure member movable between an open and closed position and adapted to close the access opening and provide a fluid tight seal when in the closed position; and (c) a pressure regulator operably coupled to the fluid opening and adapted to be coupled to a compressor, to regulate the amount of fluid supplied by a compressor to the chamber to maintain a fluid pressure within the chamber within a selected range;

wherein the chamber is sized and shaped to conform with the size and shape of the mold to minimize wasted space and reduce the amount of energy required to pressurize the chamber.

The chamber may be rectangular and have a height, length and width, the height being less than both the length and the width.

The housing may comprise reinforcement ribs to maintain the chamber in a rectangular configuration and the fluid may be air.

The closure member may be a door that is not connected to the housing, the door being larger than the access opening and having a sealing gasket attached to a perimeter of an outer surface of the door, the gasket being adapted to sealingly engage with an inner wall of the chamber to seal the access opening and provide a fluid tight chamber when the door is in the closed position.

The apparatus may further comprise a compressor operably coupled to the pressure regulator and chamber.

In accordance with a fourth aspect of the invention, there is provided a use of a machinable wax in the manufacture of cold casting molds or patterns.

According to a fifth aspect of the invention, the invention provides a method of recycling a machinable wax mold, the method comprising or consisting essentially of the steps of:

(i) melting the mold to form melted wax;
(ii) pouring the melted wax into a vessel; and
(iii) hardening the melted wax in the vessel to form a machinable wax substrate.

The vessel may be an insulated flat aluminum pan.

The method may further comprise the step of machining the wax substrate to form a mold or pattern. The machining may be done using a computer numerical control (CNC) machine.

The present method may be performed using the present pressure curing apparatus.

BRIEF DESCRIPTION OF THE DRAWINGS

The various aspects of the invention will be better understood with reference to the drawings, in which.

DETAILED DESCRIPTION OF EMBODIMENTS OF THE INVENTION

When used herein, the term "comprising" means "including without limitation." Therefore, subject matter comprising a number of integers, steps or elements may include additional integers, steps or elements not expressly recited. The term "consisting of" means including only the integers, elements or steps expressly recited and any other integers, elements or steps that are inherent therein. For example, compositions of matter may include ingredients that contain impurities that are inherently present. The term "consisting essentially of" means including the integers, elements or steps expressly recited and such additional integers, elements or steps as would not materially affect the basic and novel properties of the invention.

Figure 2:
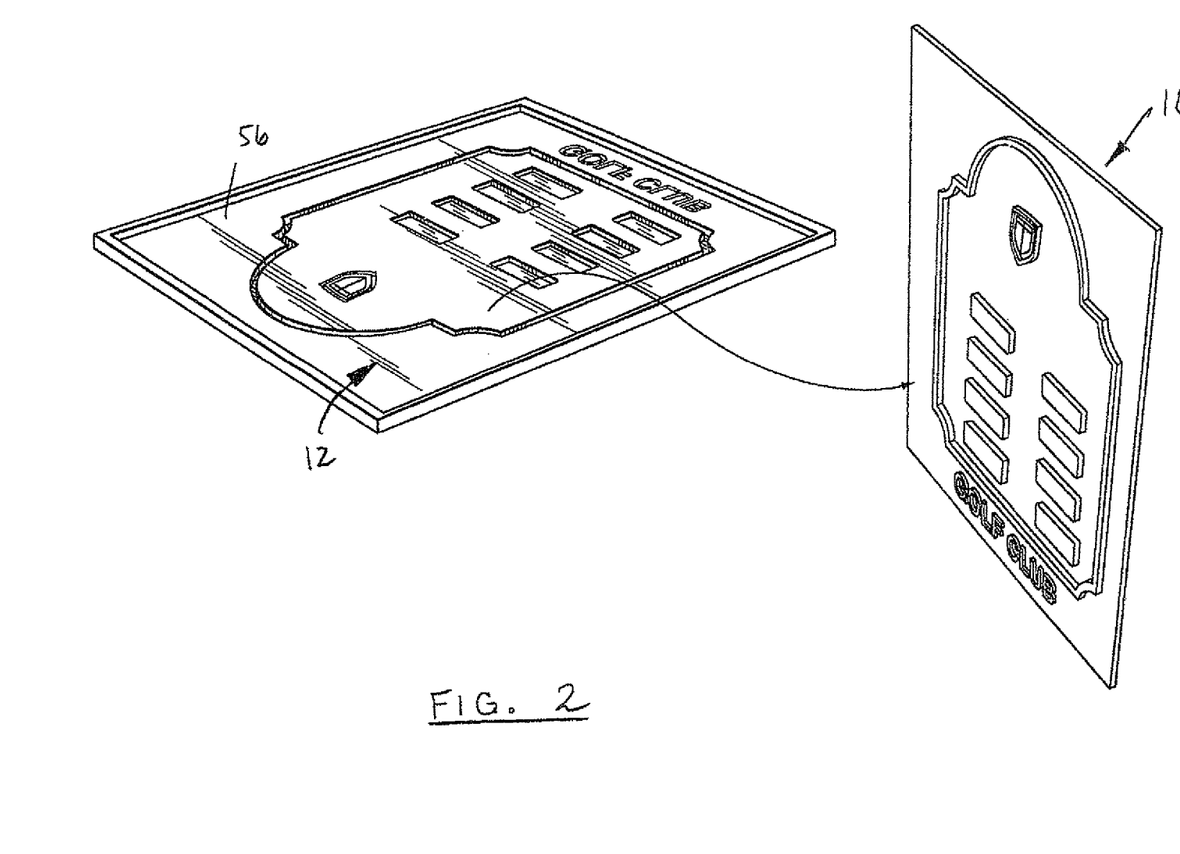
FIG. 2 is a perspective view of a mold and cold cast composite metal product made using the mold according to embodiments of additional aspects of the invention.
Figure 3:
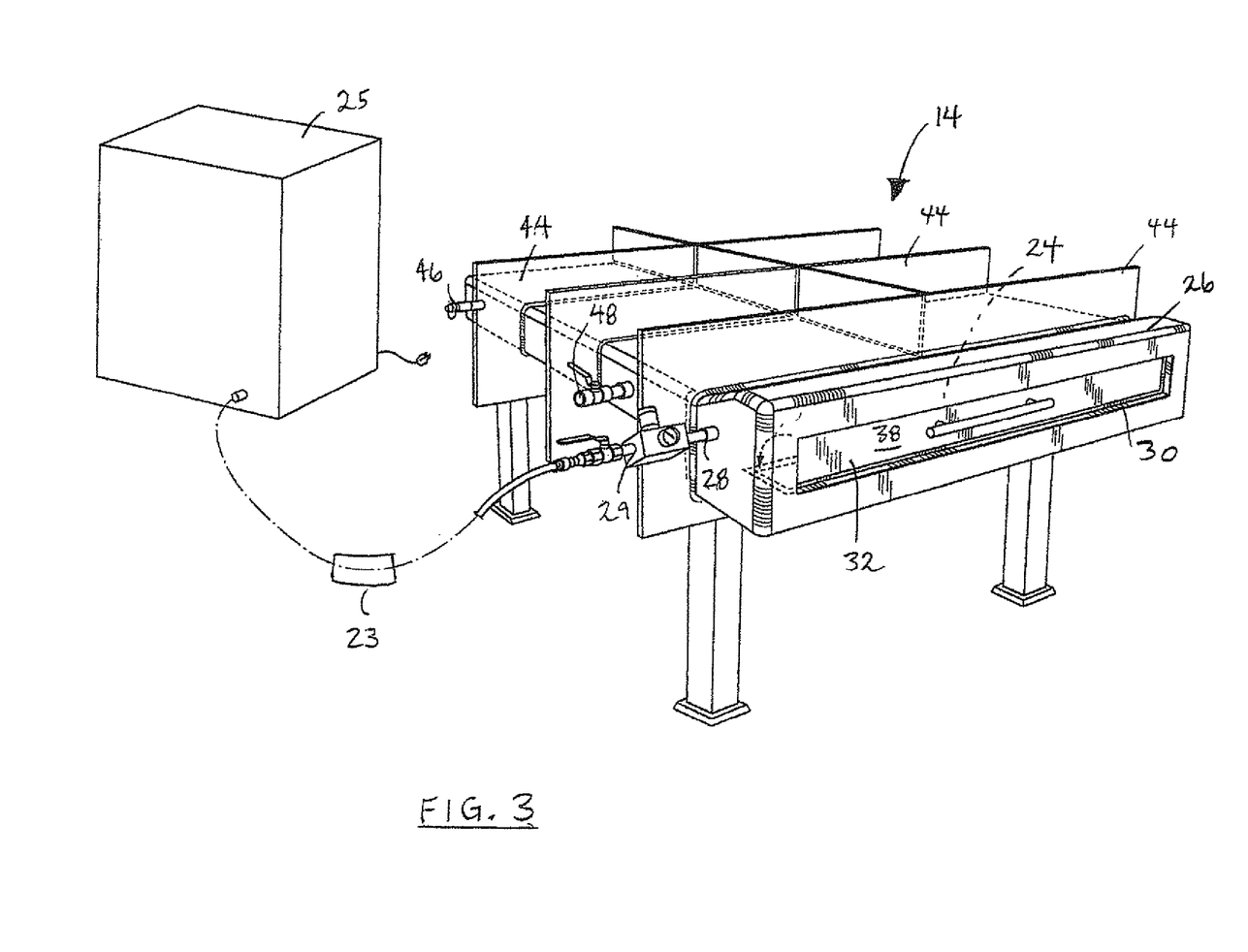
FIG. 3 is a perspective view of a pressure curing apparatus according to an embodiment of a further aspect of the invention.

Referring firstly to FIGS. 2 and 3, a cold cast composite product in the form of a composite bronze metal plaque 10, according to one embodiment of the invention, is made by making a composite mixture comprising metal particles (in the form of bronze powder described further below) together with a curable resin, pouring the composite mixture into a mold 12 made of a machinable and recyclable substrate (described further below), curing the composite mixture in a pressurized chamber of a pressure curing apparatus designated generally by reference numeral 14 for such time as to produce a sufficiently cured composite product. Once sufficiently cured, the composite mixture (now the bronze metal plaque 10) is removed from the mold 12. The composite product, if sectioned or cut in half, will appear to contain no bubbles. The method and other aspects of the present invention will now be described in more detail.

Figure 1:
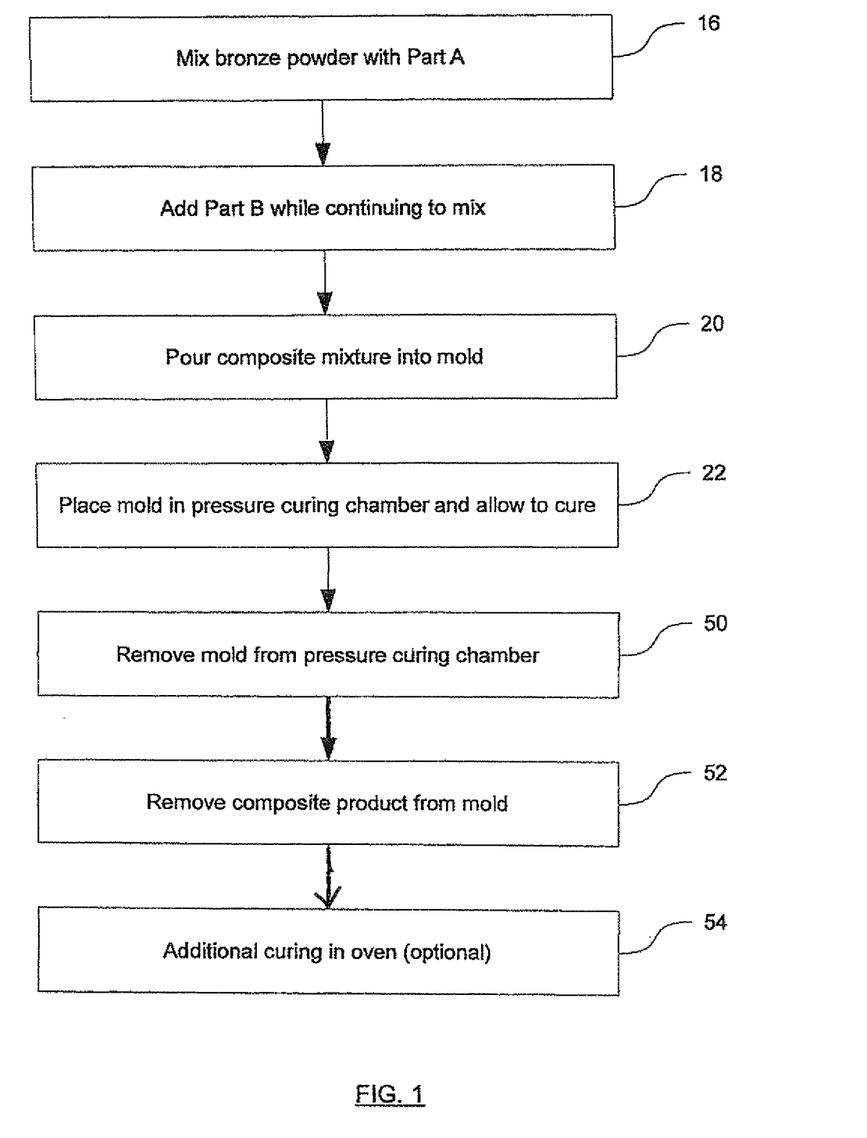
FIG. 1 is a flow-chart illustrating steps in one embodiment of a method of cold casting according to one aspect of the invention.

Referring now to FIG. 1, the composite mixture is made by mixing, in a first step 16, bronze powder with a first part (Part A) of a two-part resin system manufactured and sold by Chemtura Corporation in association with the trademark Royalcast 3101.

The bronze powder is a specialty bronze powder manufactured by ACuPowder International, LLC of Union, N.J., U.S.A. and referred to in its company brochure as Grade 201. According to company literature, the bronze powder is an alloy of stannum (9-11%) and copper (balance). The particles are spherical and very fine; over 70% w/w of the particles have a mesh size of −325, less than 1% w/w of the particles are larger than mesh size 200, and the balance of the particles is larger than mesh size 325 but smaller than mesh size 200, based on the total weight of the bronze particles.

ROYALCAST 3101 is a two-component system that has the following characteristics, including the following:

Low viscosity at room temperature
Cures to a rigid product
Easy mixing
Adjustable pot life (1-60 min.)
Low shrinkage
a moderate demold time to provide a higher mold turnaround to minimize tooling and direct labor cost Part A is a reaction product of a polyether blend with diphenylmethane diisocyanate (CAS Registry 101-68-8, 103-23-1, 9048-57-1; EC Number 202-966-0). Part A characteristics are as follows:

| | |
|---|---|
| Appearance-room temperature | Clear to slightly hazy liquid |
| Viscosity, poise (Pa · s) @ 68° F. (20° C.) | 9 (0.9) |
| Specific Gravity @ 68° F. (20° C.) | 1.114 |

In an open container, a selected amount of Part A is added and then stirred at high speed using a conventional mixer, such as a Squirrel™ drill mixer of the type used for mixing paints manufactured or sold by Homax Products, Inc. of Bellingham, Wash., U.S.A. While continuing to stir Part A, a selected amount of the bronze powder is added to Part A and the mixture is continuously stirred at high speed until the bronze powder is fully encapsulated (about 2-4 minutes). It is important that mixing be continuous to ensure that the bronze powder does not sink to or form on the bottom of the mixing container.

The absolute amounts of bronze powder and Part A are selected based on the size of the cold cast composite product to be produced. In terms of relative amounts, in this example, about 60% w/w of bronze powder is added to Part A, based on the weight of Part A.

In a second step 18, the second part of the two-part Royalcast 3101 resin system, which is a curing agent, is added to the composite mixture formed in the first step 16, while continuing to mix at high speed. The second part is a liquid polyol and organic amine curative blend. The second part of the resin system can be customized to the application depending on the desired cure time. In this example, equal parts of Royalcast 3101 PART B (having a cure time of 6 minutes) and Royalcast 3101 PART B-60 (having a cure time of 60 minutes) is used. The characteristics of Royalcast 3101 PART B and PART B-60 are as follows:

| | |
|---|---|
| Appearance-room temperature | Clear liquid |
| Viscosity, poise (Pa · s) @ 68° F. (20° C.) | 13 (1.3) |
| Specific Gravity @ 68° F. (20° C.) | 1.075 |

Processing Characteristics

| | Part B | Part B-60 |
|---|---|---|
| ROYALCAST 3101 Part A, parts by weight | 100 | 100 |
| Curative, pbw | 28 | 28 |
| Temp., Par A + B, ° F./° C. | 68/20 | 68/20 |
| Pot Life, min | 6 | 60 |
| Mold temp., ° F./° C. | 212/100 | 212/100 |
| Demold time, min | 25 | 180 |
| Post Cure temp., ° F./° C. | 212/100 | 212/100 |
| Post Cure time, hours | 16 | 1 |

For the sake of convenience, the 50/50 mixture of Royalcast 3101 PARTS B and B-60 will be simply referred to as "Part B" in the sentences that follow. The amount of Part B added is 28% w/w based on the weight of Part A. The mixture is continuously mixed until fully blended for about ⅓ of the time expected for the resin to cure without the metal, in this example, for about nine minutes. In this way, the mixture can still be poured out of the mixing container and into the mold 12 (step 20; FIG. 1).

Referring to FIGS. 1 and 3, in a next step 22, the filled mold 12 is placed into a pressure curing chamber 24 of the pressure curing apparatus 14 and the composite mixture is allowed to cure under pressure as will now be described.

With reference to FIG. 3, the apparatus 14 has a housing 26 made of one inch thick carbon steel plates that are welded together to define the rectangular pressure curing chamber 24. The housing 26 has a fluid opening 28 through which fluid (in this case air) can flow into the chamber 24 from a compressor 25 via a pressure regulator 29. The housing 26 also has an access opening 30 in communication with the chamber 24 through which the filled mold 12 is inserted into and later removed from the chamber 24. To seal the chamber 24 during the pressure casting operation, the housing 26 is provided with a closure member in the form of a rectangular carbon steel door 32 which resides in the chamber 24 and is not connected to the housing 26. The door 32 is provided with a sealing gasket (not shown) that is attached to the periphery of an outer face 38 of the door. After placing the filled mold into the chamber 24, the door 32 is manually positioned to place the sealing gasket in contact with an inner wall of the chamber 24 around the access opening 30. Pressurizing the chamber 34 serves to bias the door against the inner wall of the chamber with the gasket providing a fluid tight seal.

The pressure regulator 29 functions to regulate the amount of compressed air supplied by the compressor 25 so as to maintain the air pressure within the chamber 24 to within 40-70 psi during the pressure curing operation.

As can be inferred with reference to FIG. 3, the rectangular chamber 24 is sized and shaped to conform with the size and shape of the mold 12 which itself is rectangular, thus reducing the amount of energy required to pressurize the chamber 24. In this embodiment, the dimensions of the chamber are 6 feet×4 inches×6.5 inches however variations are possible depending on the size and shape of molds that are used.

The housing 26 includes carbon steel reinforcement ribs 44 to maintain the chamber in a rectangular configuration through pressure casting operations.

The temperature within the chamber during the pressure casting operation is typically between about 15° C. to 30° C. Care must be taken to ensure that the temperature within the chamber is not so low as to increase the viscosity of the composite mixture to a degree that is undesirable. Too high viscosity may prevent the escape of trapped air from the mixture. Also, if it is desired that metal particles drop to the bottom of the mold to form on the face of the finished product, too high viscosity may prevent this from happening before the mixture is cured. To achieve the desired viscosity, external heat may be applied to the chamber. In this example, the pressure curing apparatus 14 has a heater 23 operably coupled to the pressure chamber for heating the interior of the pressure chamber. The heater 23 is incorporated into the portion of the pressure curing apparatus between the compressor 25 and the pressure regulator 29 (as shown schematically in FIG. 3) to heat fluid (e.g. air) entering the chamber to ensure that temperatures are within the desired range. Alternatively, the heater may be incorporated into another part of the apparatus such as into the housing of the pressure chamber.

The present method does not require purging moisture from the chamber as is required by other known cold casting methods. The inventors have surprisingly found that, with the use of the present novel apparatus 14, the appearance of air bubbles is eliminated or significantly reduced from the final product with the result that it more closely resembles a solid metal casting, not just in terms of appearance, but also in terms of other criteria, such as durability, density and tensile strength.

Once the mixture has formed to a sufficiently hard consistency (about 30-45 minutes), air release members in the form of valves 46, 48 of the apparatus 14 are opened to allow air to escape from the chamber 24. This, in turn, allows the door 32 to unseal thereby providing access to the mold 12 inside the chamber. The mold 12 is then removed from the pressure curing apparatus 14 (step 50, FIG. 1).

At this stage, the composite mixture, i.e. bronze metal plaque 10, is mostly but not fully cured and is gently removed from the mold (step 52, FIG. 1) for further processing. The further processing, in this example, consists of painting the face of the composite product and then sanding the face after painting to reveal a metallic finish on the raised elements. After this processing is complete, the composite product is allowed to rest at ambient temperature for about an hour and then placed in a convection oven set at 100° C. to continue curing to a fully cured state (about 16 hours) (step 54, FIG. 1).

Once the composite mixture is cured to a full or nearly full state, the casting (i.e. bronze metal plaque 10) is removed from the oven and processed further, if required, e.g. by sandblasting.

The material of the mold 12 will now be further described.

The mold 12 is made of a wax substrate available from Freeman Manufacturing & Supply Company of Avon, Ohio called "machinable wax." The machinable wax has the following properties:

| | |
|---|---|
| Hardness | 50-55 Shore D |
| Specific Gravity | 0.92 |
| Melting Point | 226° F. (108° C.) |

The mold 12 is created by etching the wax substrate, which has been formed into a flat, rectangular panel, using a conventional computer numerical control (CNC) machine.

The mold material or wax substrate is non-abrasive and therefore non-damaging to conventional CNC equipment, easy to machine and user-friendly (machining produces chips instead of dust, for a cleaner work environment), and self-releasing which eliminates the need to spray the mold with a releasing agent prior to filling the mold with the liquid metal-resin mixture.

The mold 12 can be reused as many times as desired to cold cast additional units of product. Once the required number of products is cast and the mold 12 is no longer required, rather than discarding the mold 12, as is done with conventional rubber molds, the mold 12 can be recycled a certain number of times without significant changes to its original properties as follows.

Figure 5:
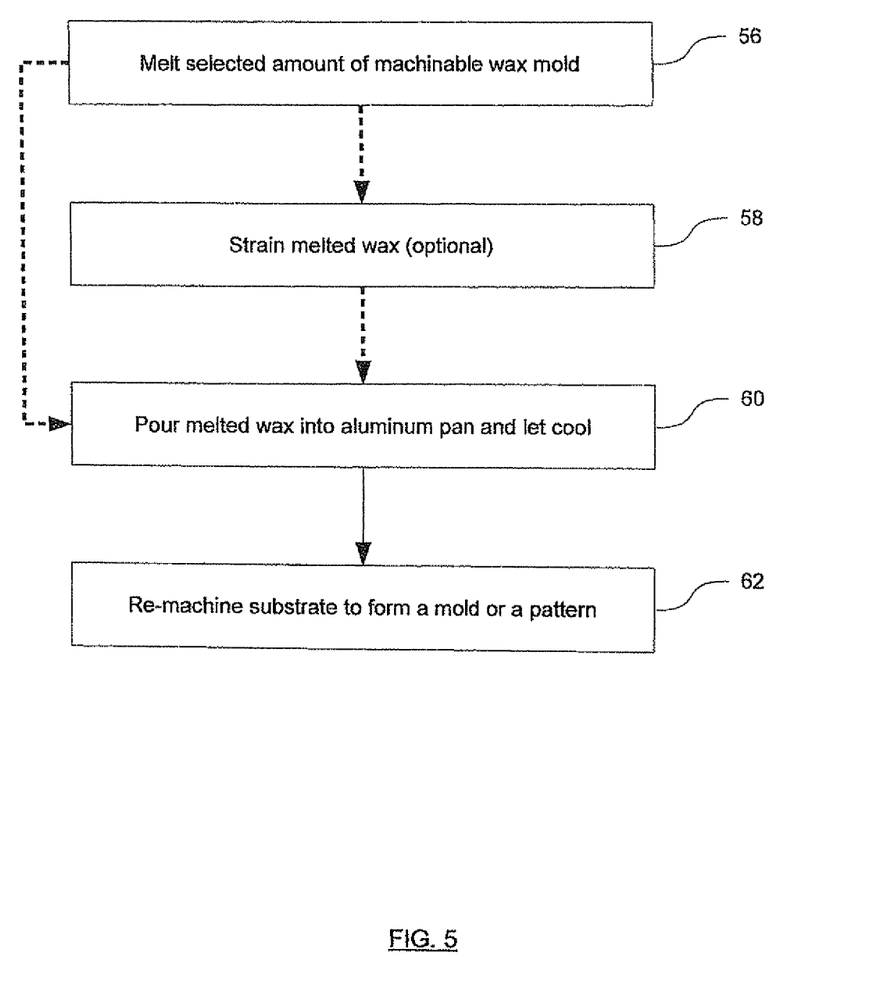
FIG. 5 is a flow-chart illustrating the steps in a method of recycling a mold or pattern in accordance with an embodiment of a further aspect of the invention.

Referring now to FIG. 5, a selected amount of the machinable wax (the amount being based on the application) is melted at a temperature of from about 149° C. to about 154° C. in a suitably sized melting pot to which heat is applied using heating elements (step 56, FIG. 5). The melting pot can withstand temperatures of at least 177° C. and is thermostatically controlled to reach the required melting temperature.

Once melted, the wax is strained through a wire mesh strainer to filter impurities such as dirt or metal particles (step 58, FIG. 5). The grade of mesh of the strainer is of the grade typically used for kitchen sieves. Note that this straining step is optional and not required if the melted wax contains no significant impurities.

After straining, the melted wax is poured into an open-top aluminum pan with a hollow insulated bottom that has been preheated to within a range of about 35° C. to about 65° C. In this example, the aluminum pan has been preheated to about 43° C. The preheating is done using heat guns operably coupled to the pan (step 60, FIG. 5). The aluminum pan is situated in a plywood box that facilitates cooling and is sized to be approximately 10% larger than the finished size and shape of the block of hardened machinable wax substrate required. Prior to filling the aluminum pan, the pan is sprayed with an aerosol silicone release agent to allow the wax, once hardened, to be readily released from the aluminum pan. After filling, a plywood box large enough to cover the entire aluminum pan is placed over top of the pan to further facilitate cooling and to prevent internal cracking and weakening of the wax as it solidifies. The wax is then allowed to cool slowly until hardened (about 16 to 48 hours depending on the thickness of the wax).

Figure 4:
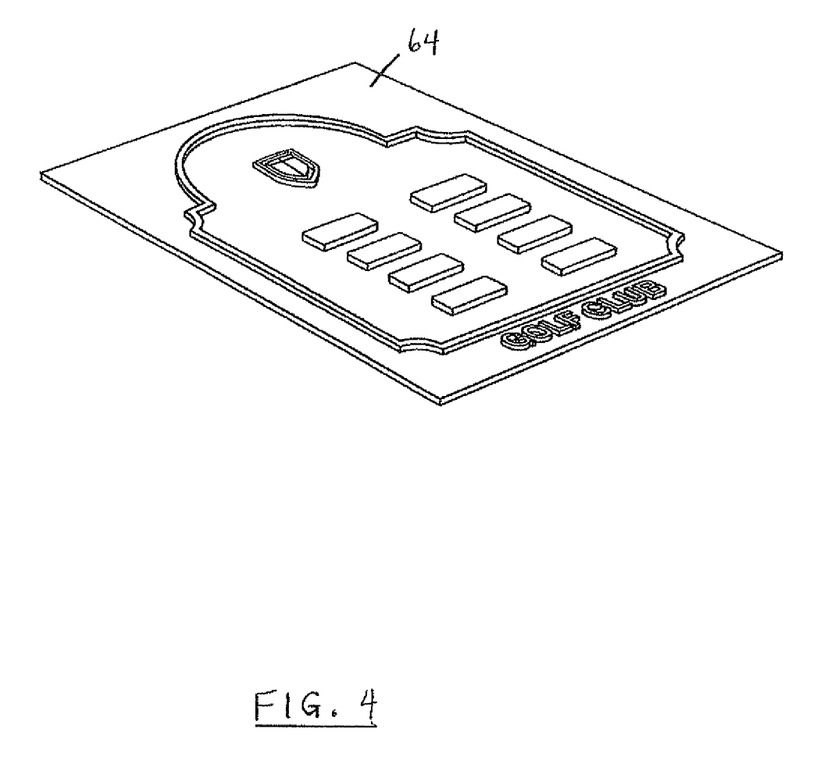
FIG. 4 is a perspective view of a pattern used to make a conventional rubber mold, the pattern being an embodiment of still a further aspect of the invention.

Once hardened, the wax can be re-machined using the CNC machine (step 62, FIG. 5) to form a new mold or a pattern 64 (see FIG. 4). The use of the machinable wax to make a pattern will be further discussed below.

Each time the machinable wax is recycled as above, it becomes slightly more brittle. The manufacturer (Freeman Manufacturing) recommends adding 10% w/w of new wax substrate to each melting cycle.

The present method of making and reusing molds is therefore both environmentally friendly and cost-effective since there is less waste and less mold material required to cold cast composite products.

Referring now to FIG. 4, the pattern 64 is a prototype that is used to make a mold. For example, the pattern 64 can be used to make traditional latex rubber molds for large volume applications.

The person skilled in the art would readily appreciate that the above description is by way of example only and that numerous modifications can be made to the various aspects of the invention without departing from the scope thereof.

For example, depending on the desired result, the relative amount of metal particles added to the resin can be varied based on the weight of the resin system. Depending on the type of metal, shape and size of metal particles, and type of resin curing system employed, anywhere from about 30, 50, 70, 90, 100 and 200% w/w, and up to about 950, 800, 600, 400, and 300% w/w, of metal particles, based on the weight of the first part of the resin system, can be employed. For example, if a lighter metal is used, such as aluminum, less metal is required, e.g. from about 75 to about 100% w/w, based on the weight of the first part of the resin system can be employed. The amount of the curable resin that is used, relative to the amount of the metal particles, must be such that there is enough to bind the metal particles together in a solid cured product. Adding more metal particles will result in a heavier casting that more closely resembles a solid cast metal product in terms of appearance, weight, durability and other factors, while adding less metal particles will reduce costs and produce a lighter weight article with greater tensile strength. The amount of metal particles to include, relative to the amount of the resin system, and vice versa, can be determined as a matter of routine experimentation.

Many different types of metals or metal alloys can be used as are available in the market, such as brass, copper, aluminum, nickel silver, stainless steel, pewter, silver flake, iron, molybdenum and mixtures thereof. For example, a mixture of 20% w/w brass powder and 80% w/w copper powder, based on the total weight of the powder can be used to produce a finished cold cast product that looks like solid metal bronze, Non-metal synthetic ingredients can also be used such as particulate or powdered Kevlar.

The shape and size of the metal particles can be varied, depending on what is desired. In general, for composite products that are to be made to resemble solid cast metal products in factors other than only appearance, it is desirable to reduce the particle size as much as possible (e.g. to −325 mesh) and to use particles that are spherical in shape. However, metal flakes, and a combination of spherical powder and flakes, can also be used, depending on the desired effect.

A variety of different resin systems can be used as are known in the art such as polyesters and acrylics. Furthermore, additives may be included to prevent degradation of the cured resin due to exposure to light, heat and/or metal such as the UV inhibitors/stabilizers and thermal stabilizers sold in association with the trademarks CIBA TINUVIN B 75 and IRGANOX MD 1024.

The cure time can be altered by changing the nature and amount of the resin system that is used. For example, by increasing the amount of Royalcast 3101 PART B relative to Royalcast 3101 PART B-60, curing time can be reduced and vice versa. Furthermore, as mentioned above, increasing the amount of curable resin, relative to the amount of metal particles added, will also decrease the cure time.

If it is desired that the metal particles sink to the bottom of the mold to form on the facial surface of the finished product (to economize on the amount of metal powder used), then a greater proportion of Royalcast 3101 PART B-60 can be used to provide a longer curing time. If, on the other hand, it is desired that the metal powder be uniformly distributed throughout the finished product, then the amount of metal particles added can be increased and the cure time reduced by using more of Royalcast 3101 PART B as a proportion of the total PART B resin. A sufficiently fast cure time will serve to trap the metal particles in the resin and not let the particles sink to the bottom of the mold.

Metal particles can also be allowed to sink to the bottom of the mold by selecting the resin system according to the viscosity. The lower the viscosity, the faster the metal particles will sink to the bottom of the mold and form on the face of the finished product before curing. Alternatively, the method of cold casting may include a step of heating the resin system to about 22-27° C., prior to the addition of metal particles. This will also serve to reduce the viscosity of the liquid composite mixture and allow the metal powder to fall to the bottom of the mold faster. This approach can be used with resin systems that have fast cure times to provide a method of cold casting composite metal products in less time.

When the Royalcast 3101 resin system is used, ideally the ratio of PART B to PART B-60 is from 50:50 to 30:70. When adjusting or optimizing a curable resin system, one must consider that the liquid composite mixture must not cure before it can be poured into a mold. To increase the size and weight of the finished product, and/or to economize on the cost of materials used, a mixture of calcium carbonate and curable resin can be added as a "back pour," after the face of the casting (bottom of the mold) has been cast and is set. Fillers can also be added to the composite mixture prior to curing in the pressure chamber. Such fillers include ground calcium carbonates (GCC), coated GCC, general purpose clays, polymer grade talcs, calcinated clays, coated calcinated clays, precipitated calcium carbonates, precipitated silicas, common carbon blacks, mica, wollastonite, calcium sulphate, alumina trihydrate, magnesium hydroxide, aluminium hydroxide, zeolite, zinc oxide, fiber glass, wood, straw, shell, and annual vegetation. The filler material, depending on what is used, may impart a desirable texture to the finished product.

If desired, a back piece or filler can be added to the mold to form a back of the finished casting. The back piece or filler can be imprinted with the manufacturer's name or incorporate a boss or studs to facilitate mounting of the casting on a wall.

The pressure curing apparatus 14 can be made to other sizes and dimensions. For example, in another embodiment, the apparatus is made from ¾ inch carbon steel and has an internal chamber that is 42 inches×32 inches×6.5 inches. It will be appreciated that the shape and size of the curing chamber should conform to the mold placed therein and that the objective is to economize on space inside the chamber to save on energy costs, manufacturing space, and equipment costs. While the present apparatus uses compressed air in the pressure curing chamber 24, other gases such as compressed nitrogen can be used instead.

The post-curing step in a convection or other type of oven is optional though preferred as this step allows the product to fully cure faster than would occur if the product was simply allowed to rest at ambient temperature. It will be appreciated that the above described step of removing the composite product for processing before inserting the product into the oven is optional. The mold containing the mostly cured composite product can be inserted directly from the pressure curing chamber into a heated oven. However, it is preferred to let the article rest at room temperature for a period of time, e.g. 1 to 48 hours, before inserting it into the oven. The mold and contents, of course, can be taken out of the pressure curing chamber and simply allowed to sit at room temperature until fully cured.

The processing of the cured composite product can also occur at different stages. For example, the processing can occur before and/or after the post-curing process by which the mostly cured composite mixture cures to a fully cured state. In this context, "processing" means treating the composite product to improve its aesthetic and/or functional characteristics and includes, for example, sanding, shot-blasting, sand-blasting, tooling, grinding, polishing, and painting.

As mentioned above, the amount of time required for the composite product to cure to a fully cured state depends at least in part on the temperature of at which the product is post-cured and the curing time. In the above example, if the convection oven was set to 60° C. rather than 100° C., then the time required for the composite product to fully cure would be extended to about 24 hours from about 16 hours.

The present method of cold casting a composite product, pressure curing apparatus, and method of making and reusing wax molds or patterns can be applied to the manufacture of non-metal castings as well. In such cases, no metal is added to the liquid resin system prior to pouring into a mold.

The present method of making a mold for use in cold casting may include forming a mold consisting of two parts, a first part being a custom machined mold made from the above described machinable wax substrate in accordance with the method described above, and a second part being made from traditional latex rubber using a pattern made from machinable wax using a CNC machine. The latex rubber mold can be made in the form of a generic border or frame that can be reused for many different applications, while the wax mold can be made to seat inside the latex rubber mold and have a custom pattern for use in small volume or "one-off" applications.

As numerous variations to the invention or inventions disclosed herein are possible, the invention(s) shall not be limited by the foregoing description but is/are defined by the following claims.

The invention claimed is:

1. A method of cold casting a composite product, comprising the steps of:
   i. mixing a curable resin with metal particles to form a composite mixture, wherein the curable resin is selected to have a cure time and viscosity that allows the metal particles to fall to the bottom of the mold to appear on the face of the composite product;

ii. pouring the composite mixture into a mold made of a machinable and recyclable substrate;

iii. causing the metal particles to fall to the bottom of the mold to appear on the face of the composite product through the selection of curable resin and metal particles; and iv. curing the composite mixture in a pressurized chamber for a time sufficient to eliminate the appearance of bubbles in the cured composite mixture;

wherein the chamber is pressurized to between about 40 and about 70 psi.

2. The method of claim 1, wherein more than 70% w/w of the metal particles, based on the total weight of the metal particles, have a mesh size of −325.

3. The method of claim 1, wherein the mold is made of machinable wax.

4. The method of claim 1, wherein the pressurized chamber is sized and shaped to conform to the size and shape of the mold to reduce wasted space around the mold.

5. The method of claim 1, wherein the curable resin is made from a two part resin system, the first part being a reaction product of a polyether blend with diphenylmethane diisocyanate and the second part being a liquid polyol and organic amine curative blend.

6. The method of claim 1, wherein the curable resin is heated to about 22-27° C. prior to or during the curing in the pressurized chamber.

7. The method of claim 1, further comprising the step of curing the composite mixture further in an oven at an elevated temperature of from about 55° C. to about 125° C. until it is fully cured.

8. The method of claim 1, wherein the composite mixture further comprises a filler.

9. The method of claim 8, wherein the filler is chosen from ground calcium carbonates (GCC), coated GCC, general purpose clays, polymer grade talcs, calcinated clays, coated calcinated clays, precipitated calcium carbonates, precipitated silicas, common carbon blacks, mica, wollastonite, calcium sulphate, alumina trihydrate, magnesium hydroxide, aluminium hydroxide, zeolite, zinc oxide, fiber glass, wood, straw, shell, and annual vegetation.

10. The method of claim 1, wherein the pressurized chamber forms a part of a pressure curing apparatus, the pressure curing apparatus comprising:

a. a housing defining the pressurized chamber, the housing having a fluid opening through which fluid can flow into the chamber and an access opening in communication with the chamber through which a filled mold can be inserted into the chamber and removed from the chamber, b. a closure member movable between an open and closed position and adapted to close the access opening and provide a fluid tight seal when in the closed position; and c. a pressure regulator operably coupled to the fluid opening and adapted to be coupled to a compressor, to regulate the amount of fluid supplied by the compressor to the chamber to maintain a fluid pressure within the chamber within a selected range;

d. wherein the chamber is sized and shaped to conform with the size and shape of the mold to minimize wasted space and reduce the amount of energy required to pressurize the chamber.

\* \* \* \* \*